(12) United States Patent
Ahn et al.

(10) Patent No.: US 11,769,921 B2
(45) Date of Patent: Sep. 26, 2023

(54) BATTERY PACK

(71) Applicant: Samsung SDI Co., Ltd., Yongin-si (KR)

(72) Inventors: Byungkook Ahn, Yongin-si (KR); Changyong Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 143 days.

(21) Appl. No.: 17/138,087

(22) Filed: Dec. 30, 2020

(65) Prior Publication Data
US 2021/0203028 A1    Jul. 1, 2021

(30) Foreign Application Priority Data

Dec. 31, 2019   (KR) .................. 10-2019-0179789

(51) Int. Cl.
*H01M 50/204*   (2021.01)
*H01M 50/543*   (2021.01)
*H01M 50/502*   (2021.01)
*H01M 50/166*   (2021.01)

(52) U.S. Cl.
CPC ....... *H01M 50/204* (2021.01); *H01M 50/166* (2021.01); *H01M 50/502* (2021.01); *H01M 50/543* (2021.01)

(58) Field of Classification Search
CPC ............. H01M 50/204; H01M 50/502; H01M 50/543; H01M 50/166
See application file for complete search history.

(56) References Cited

U.S. PATENT DOCUMENTS

| 6,379,837 | B1 | 4/2002 | Takahashi et al. |
| 2016/0111692 | A1* | 4/2016 | Morita .............. H01M 10/6551 429/96 |
| 2020/0220132 | A1* | 7/2020 | Bourke .................. B60L 53/14 |
| 2021/0167453 | A1* | 6/2021 | Kawakami .......... H01M 50/271 |
| 2022/0216567 | A1* | 7/2022 | Sueyoshi .............. H01M 50/24 |

FOREIGN PATENT DOCUMENTS

| JP | 2006-156171 A | 6/2006 |
| JP | 4631118 B2 | 11/2010 |
| JP | 5294575 B2 | 6/2013 |

* cited by examiner

*Primary Examiner* — Brian R Ohara
*Assistant Examiner* — Emily Elizabeth Freeman
(74) *Attorney, Agent, or Firm* — Lewis Roca Rothgerber Christie LLP (57) ABSTRACT

A battery pack includes: a plurality of battery cells; and a holder including cell regions in which the plurality of battery cells are arranged, and well regions each arranged between adjacent cell regions of the cell regions, each of the well regions being connected to at least one of the adjacent cell region and being filled with a filling resin.

28 Claims, 9 Drawing Sheets

BATTERY PACK

CROSS-REFERENCE TO RELATED APPLICATION

This application claims priority to and the benefit of Korean Patent Application No. 10-2019-0179789, filed on Dec. 31, 2019 in the Korean Intellectual Property Office, the entire disclosure of which is incorporated herein by reference.

BACKGROUND

1. Field

Aspects of one or more embodiments relate to a battery pack.

2. Description of the Related Art

In general, secondary batteries refer to batteries that can be repeatedly charged and recharged, unlike non-rechargeable primary batteries. Secondary batteries are used as energy sources of devices, such as mobile devices, electric vehicles, hybrid vehicles, electric bicycles, or uninterruptible power supplies. Secondary batteries are individually used or secondary battery modules or packs each including a plurality of secondary batteries connected as one unit are used according to the types of external devices using secondary batteries.

Unlike small mobile devices, such as cellular phones, operable for a certain period of time using a single battery, devices such as electric vehicles or hybrid vehicles having long operation times and consuming large amounts of electricity may use battery modules each including a plurality of batteries to handle issues relating to power and capacity, and the output voltages or currents of the battery modules may be increased by adjusting the number of batteries included in the battery module.

SUMMARY

According to an aspect of one or more embodiments, a battery pack having an improved filling resin structure for protecting electrical connections of battery cells is provided.

According to another aspect of one or more embodiments, a battery pack configured to regulate an amount of a filling resin for decreasing material costs and a weight of the battery pack is provided.

Additional aspects will be set forth, in part, in the description which follows and, in part, will be apparent from the description, or may be learned by practice of the presented embodiments of the disclosure.

According to one or more embodiments, a battery pack includes: a plurality of battery cells; and a holder including cell regions in which the plurality of battery cells are arranged, and well regions each arranged between adjacent cell regions of the cell regions, each of the well regions being connected to at least one of the adjacent cell region and being filled with a filling resin.

In one or more embodiments, each of the well regions may be provided among three adjacent cell regions of the cell regions and may be fluidly connected to a cell region of the three cell regions.

In one or more embodiments, each of the well regions may be surrounded by three sides which define boundaries with adjacent cell regions, and the three sides may define the boundaries respectively with the adjacent cell regions.

In one or more embodiments, each of the well regions may have a curved triangular shape defined by the three sides which meet each other and each have an arc shape convex toward a center of the well region.

In one or more embodiments, one of the three sides of the well region may be provided as an open side which is at least partially open to an adjacent cell region defined by the side.

In one or more embodiments, the well region may be fluidly connected to the adjacent cell region through the open side.

In one or more embodiments, the filling resin may be connected to the well regions through the open sides and may be provided on circumferences of the plurality of battery cells.

In one or more embodiments, the filling resin may be provided on the circumferences of the plurality of battery cells at positions which are separate from each other along the circumferences of the plurality of battery cells.

In one or more embodiments, each of the cell regions may be fluidly connected to first and second well regions which are opposite each other with the cell region therebetween.

In one or more embodiments, the well regions may include: first well regions which are connected to terminal holes of the cell regions; and second well regions which are not connected to the terminal holes of the cell regions.

In one or more embodiments, each of the first well regions may include three curved sides which define the first well region and include an open side connected to a terminal hole, and each of the second well regions may include three curved sides defining the second well region, and one of the three curved sides, which has a greatest distance among distances from the three curved sides to terminal holes of cell regions respectively defined by the three curved sides, may be an open side.

In one or more embodiments, the terminal holes of the cell regions may be second terminal holes through which upper-end edges of the plurality of battery cells are exposed.

In one or more embodiments, the cell regions may include cell regions arranged in first and second rows which are adjacent to each other and parallel to a first direction, and the first and second well regions may be provided at different positions between the cell regions of the first and second rows.

In one or more embodiments, each of the first well regions may be provided among two cell regions of the first row and a cell region of the second row at a position relatively close to battery cells of the first row, and each of the second well regions may be provided among two cell regions of the second row and a cell region of the first row at a position relatively close to battery cells of the second row.

In one or more embodiments, the first and second well regions may be arranged in a row direction of the plurality of battery cells.

In one or more embodiments, the row direction of the plurality of battery cells may be parallel to a long side of the holder.

In one or more embodiments, the cell regions may include first and second terminal holes through which first and second terminals of the plurality of battery cells are exposed, and the row direction of the plurality of battery cells may be a direction from the first terminal holes to the second terminal holes.

In one or more embodiments, each of the cell regions may include first and second terminal holes through which first and second terminals of a battery cell are exposed, and the first and second terminal holes and the first well regions may be connected to each other and define one opening.

In one or more embodiments, bonding wires may be respectively connected to first and second terminals of the plurality of battery cells through first and second terminal holes of the holder.

In one or more embodiments, the filling resin may cover the bonding wires together with the first and second terminals of the plurality of battery cells.

In one or more embodiments, the holder may further include first and second plate members which are parallel to each other and separate from each other in a length direction of the plurality of battery cells, and a hollow cylinder member which surrounds at least portions of circumferences of the plurality of battery cells between the first and second plate members.

In one or more embodiments, the first plate member may include first and second terminal holes in the cell regions to respectively expose first and second terminals of the plurality of battery cells, and well holes in the well regions to expose the well regions.

In one or more embodiments, the first plate member may cover the cell regions except for the first and second terminal holes.

In one or more embodiments, the second plate member may include assembly holes in the cell regions to receive the circumferences of the plurality of battery cells into the cell regions through the assembly holes, and well bottoms in the well regions to confine the filling resin in the well regions.

In one or more embodiments, the well regions may extend from the well holes of the first plate member to the well bottoms of the second plate member.

In one or more embodiments, the hollow cylinder member may surround portions of the circumferences of the plurality of battery cells and may include portions open to the plurality of battery cells.

In one or more embodiments, the open portions of the hollow cylinder member may form open sides of the well regions provided between the first and second plate members.

BRIEF DESCRIPTION OF THE DRAWINGS

The above and other aspects, features, and advantages of embodiments of the present disclosure will be more apparent from the following description of some example embodiments taken in conjunction with the accompanying drawings, in which.

DETAILED DESCRIPTION

Reference will now be made in further detail to embodiments, some examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As used herein, the singular forms "a," "an," and "the" are intended to include the plural forms as well, unless the context clearly indicates otherwise.

It is to be understood that the terms "comprise," "include," and "have" used herein specify the presence of stated features or components, but do not preclude the presence or addition of one or more other features or components.

Sizes of components in the drawings may be exaggerated for convenience of description. In other words, since the sizes and thicknesses of components in the drawings may be arbitrarily illustrated for convenience of description, the following embodiments are not limited thereto.

It is to be understood that when a layer, region, or component is referred to as being "connected to" another layer, region, or component, it may be directly connected to the other layer, region, or component or may be indirectly connected to the other layer, region, or component with one or more intervening layers, regions, or components interposed therebetween. For example, it is to be understood that when a layer, region, or component is referred to as being "electrically connected to" another layer, region, or component, it may be directly electrically connected to the other layer, region, or component or may be indirectly electrically connected to the other layer, region, or component with one or more intervening layers, regions, or components interposed therebetween.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Herein, a battery pack will now be described according to some example embodiments with reference to the accompanying drawings.

Figure 1:
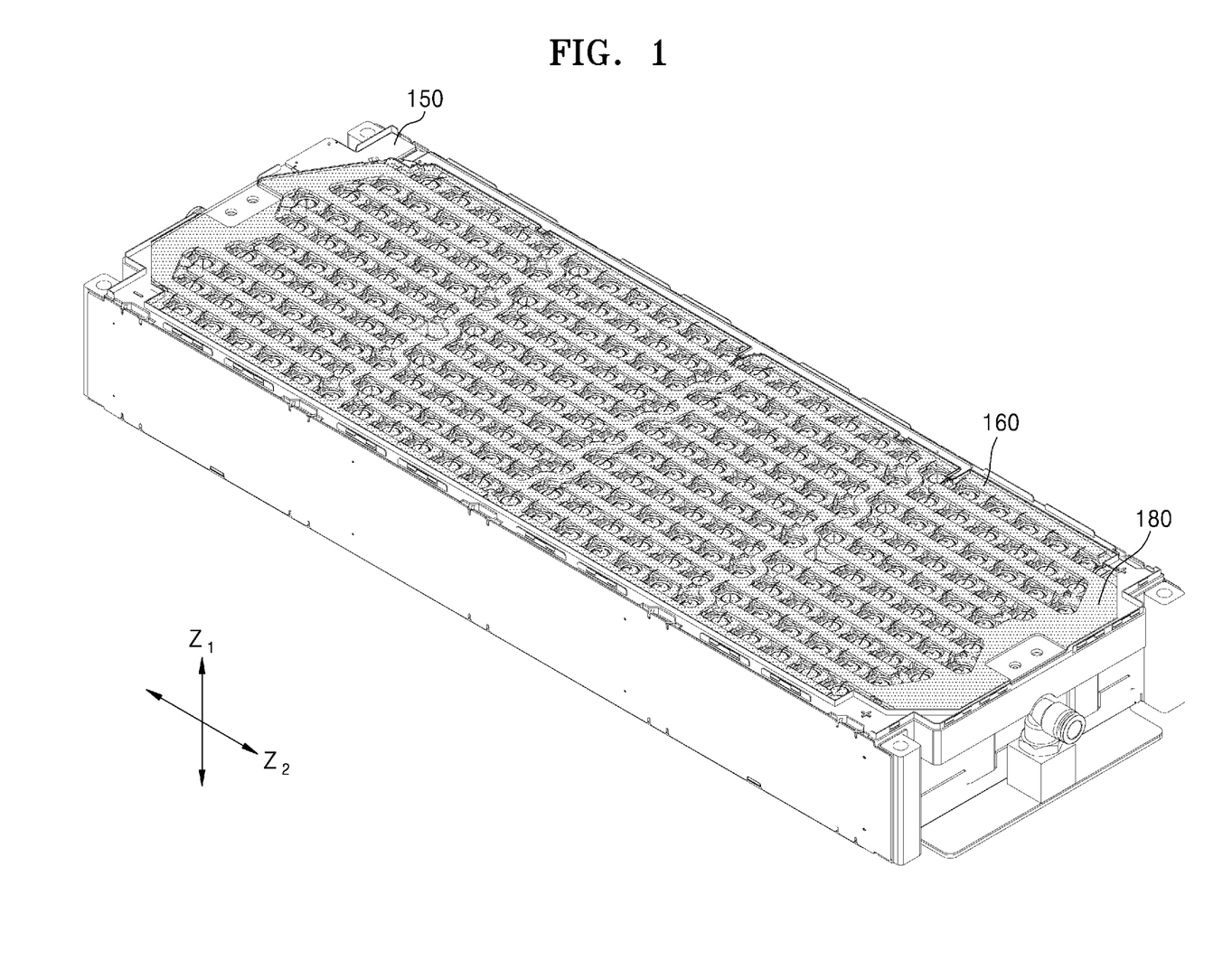
FIG. 1 is a perspective view illustrating a battery pack according to an embodiment.
Figure 2:
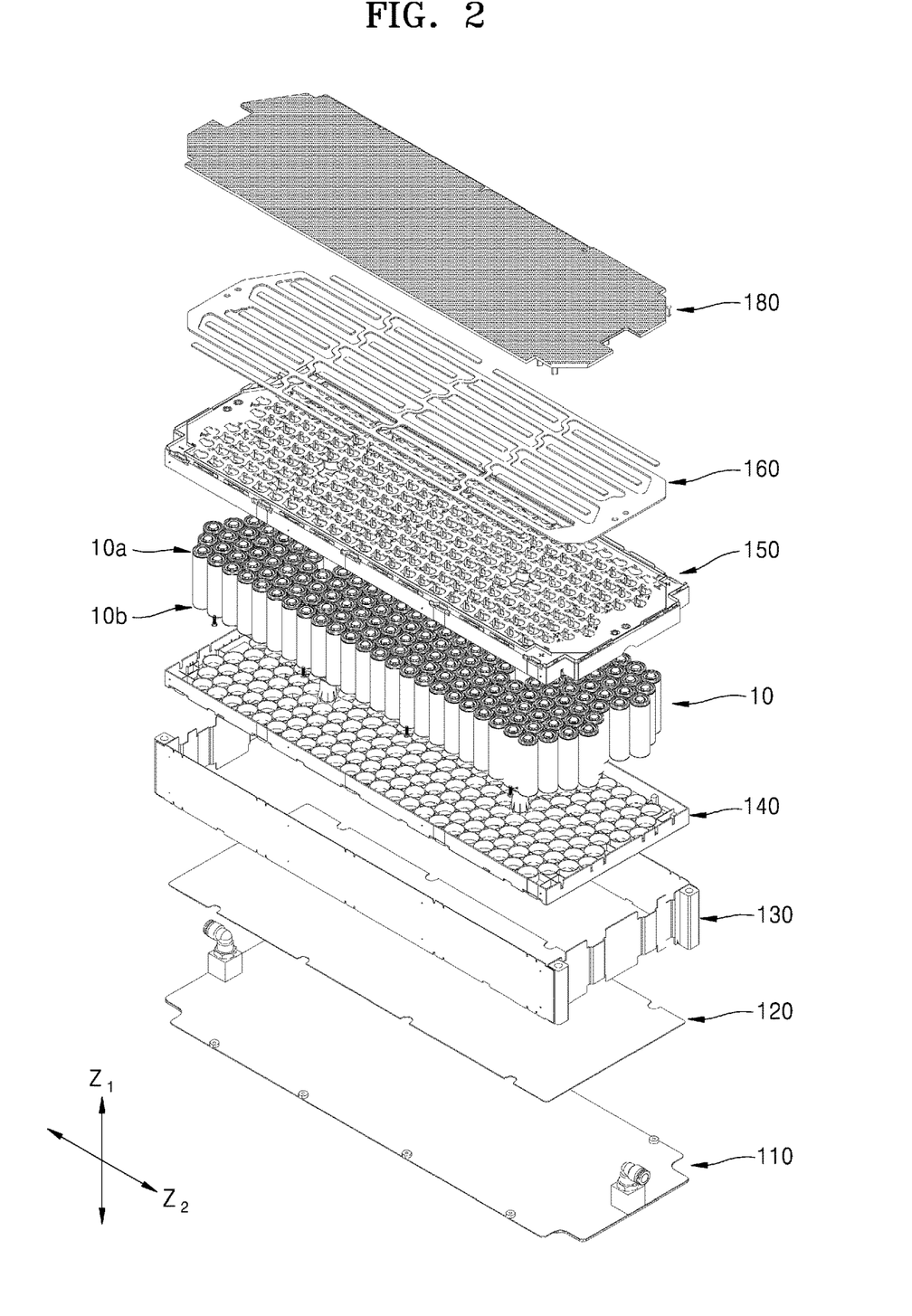
FIG. 2 is an exploded perspective view illustrating the battery pack illustrated in FIG. 1.
Figure 3:
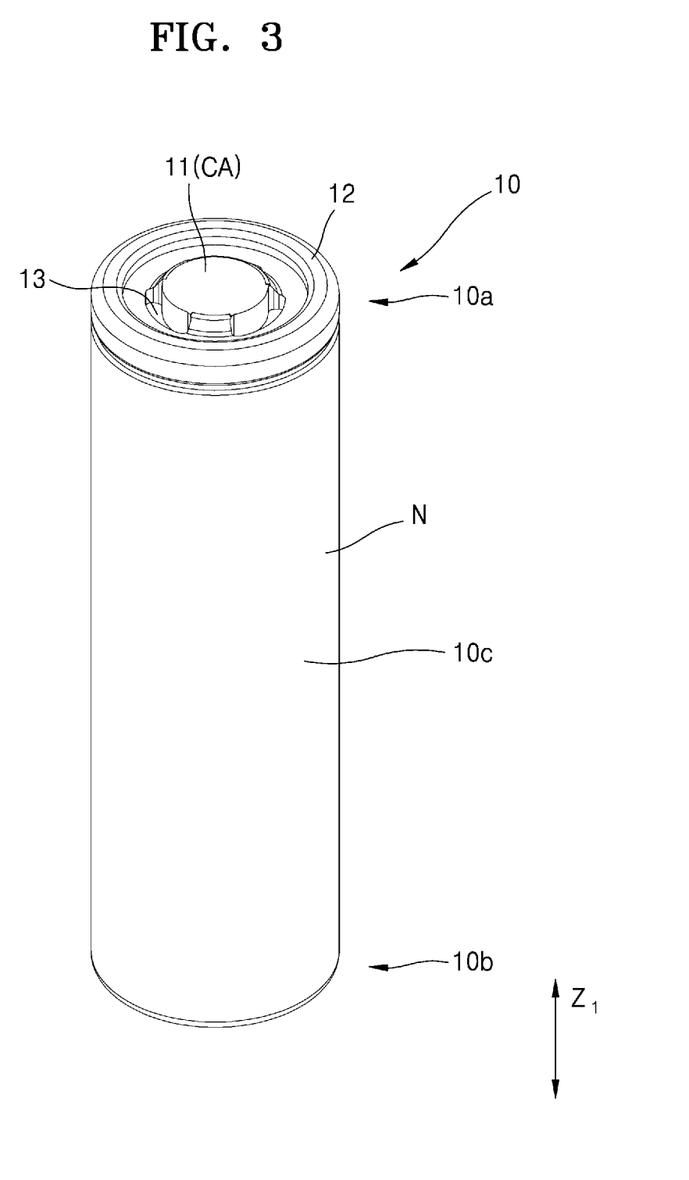
FIG. 3 is a perspective view illustrating a battery cell illustrated in FIG. 2.
Figure 4:
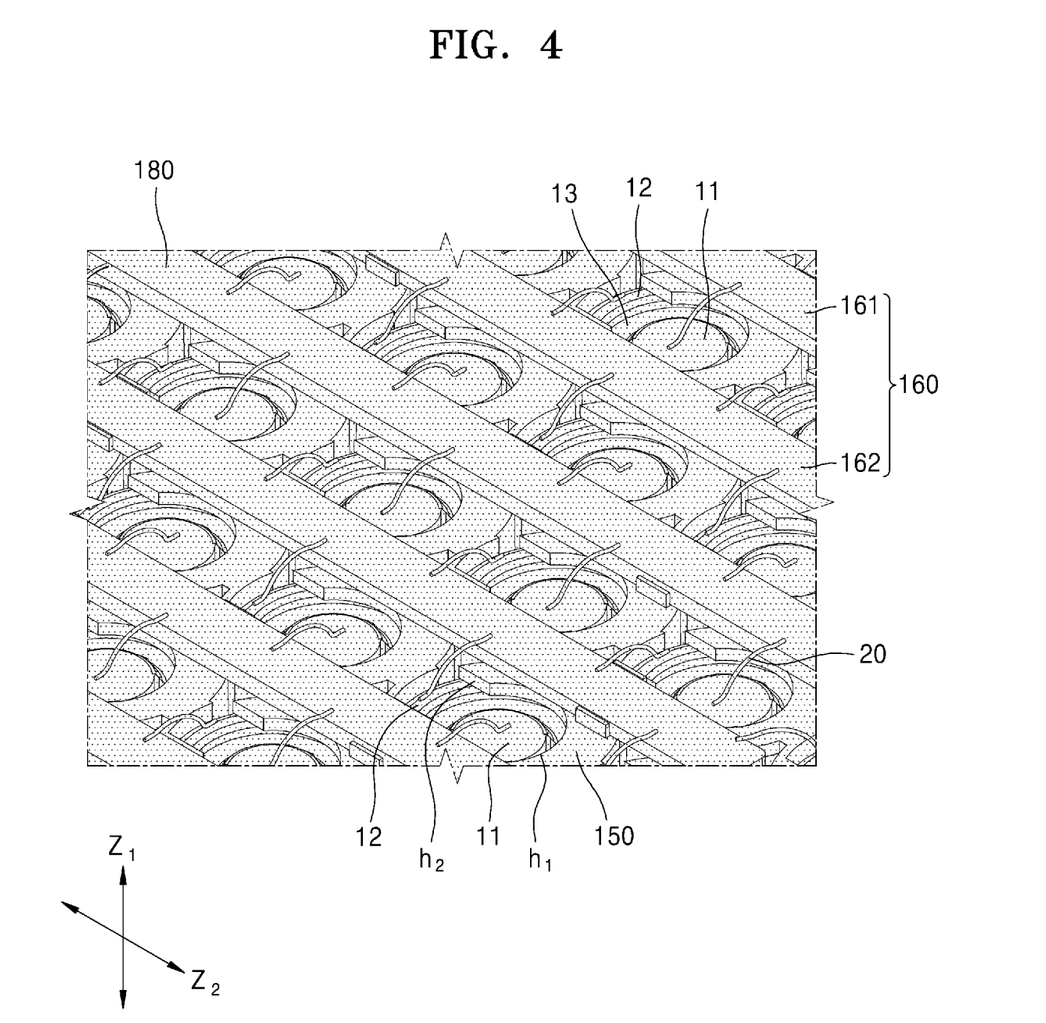
FIG. 4 is a perspective view illustrating a region of the battery pack illustrated FIG. 1.

FIG. 1 is a perspective view illustrating a battery pack according to an embodiment; FIG. 2 is an exploded perspective view illustrating the battery pack illustrated in FIG. 1; FIG. 3 is a perspective view illustrating a battery cell illustrated in FIG. 2; and FIG. 4 is a perspective view illustrating a region of the battery pack illustrated FIG. 1.

Referring to FIG. 2, a battery pack according to an embodiment may include: a plurality of battery cells 10; a first holder 150 (a holder) in which the battery cells 10 are assembled; and a filling resin 180 which is provided on the first holder 150 to cover the first holder 150 in which the battery cells 10 are assembled.

Referring to FIG. 3, each of the battery cells 10 may include an upper end 10a and a lower end 10b in a length direction of the battery cell 10 and, in an embodiment, may be provided as a circular battery cell having a cylindrical circumference between the upper end 10a and the lower end 10b. Throughout the present specification, a vertical direction Z1 may refer to the length direction of the battery cells 10. In an embodiment, first and second terminals 11 and 12 having different polarities may be provided on the upper end 10a of each of the battery cells 10. Each of the battery cells 10 may include a cap assembly CA and a can N clamped to an edge of the cap assembly CA with an insulating member (not shown) therebetween, wherein an upper end of the cap assembly CA may form the first terminal 11, and an upper end of the can N may form the second terminal 12. The can N may extend from the lower end 10b of the battery cell 10 to the upper end 10a of the battery cell 10 along a circumference 10c of the battery cell 10.

The first and second terminals 11 and 12 may be provided at different positions at the upper end 10a of the battery cell 10 and may be electrically insulated from each other. For example, the first terminal 11 may be provided at a center region of the upper end 10a of the battery cell 10, and the second terminal 12 may be provided at an edge region of the upper end 10a of the battery cell 10 around the first terminal 11. In an embodiment, a safety vent 13 may be provided between the first and second terminals 11 and 12 of the battery cell 10. The safety vent 13 may have a structure which is easily fractured in response to an excessive internal pressure of the battery cell 10 to relieve the excessive internal pressure.

Referring to FIG. 4, in an embodiment, the first and second terminals 11 and 12 are both provided at the upper end 10a of each of the battery cells 10, and all electrical connections to the battery cells 10 may be made through the upper ends 10a of the battery cells 10 by connecting bonding wires 20 to the first and second terminals 11 and 12. For example, the bonding wires 20 may be provided as a medium for electrical connection between the first and second terminals 11 and 12 of the battery cells 10 and first and second bus bars 161 and 162. To this end, first ends of the bonding wires 20 may be connected to the first and second terminals 11 and 12 of the battery cells 10, and second ends of the bonding wires 20 may be connected to the first and second bus bars 161 and 162. In an embodiment, the bonding wires 20 may be provided as thin metal wires, and the bonding wires 20 and the first and second terminals 11 and 12 of the battery cells 10 to which the bonding wires 20 are connected may be embedded in the filling resin 180 to insulate the bonding wires 20 from the outside and securely fix the positions of the bonding wires 20. As described later, the filling resin 180 may be provided on the first and second terminals 11 and 12 of the battery cells 10 exposed on the first holder 150 and may also be provided on the circumferences 10c (refer to FIG. 3) of the battery cells 10 inserted in the first holder 150, such that the battery cells 10 may be firmly fixed without movement such as vibration or rotation, and the bonding wires 20 may not be damaged by movement of the battery cells 10.

As described above, all electrical connections to the battery cells 10 may be made through the upper ends 10a of the battery cells 10, and no electrical connection may be made at the lower ends 10b of the battery cells 10, such that the battery cells 10 may be cooled through the lower ends 10b of the battery cells 10. Referring to FIG. 2, the lower ends 10b of the battery cells 10 may be thermally connected to a cooling plate 110 arranged under the battery cells 10, and heat may be dissipated from the battery cells 10 through the cooling plate 110. In this case, a heat transfer medium 120 may be arranged between the lower ends 10b of the battery cells 10 and the cooling plate 110 to reduce thermal resistance and provide reliable thermal coupling between the lower ends 10b of the battery cells 10 and the cooling plate 110.

The battery cells 10 may be structurally bound to each other by inserting the battery cells 10 into the first holder 150, to modularize the battery cells 10 in a pack form. In an embodiment, the first holder 150 may be fitted to upper portions of the battery cells 10, and a second holder 140 may be arranged under the battery cells 10 and fitted to lower portions of the battery cells 10. As described above, due to the first holder 150 and the second holder 140 which are respectively fitted to the upper and lower portions of the battery cells 10, the battery cells 10 may be maintained in position and structurally bound as a group of battery cells forming the battery pack. The first holder 150 and the second holder 140 may define assembly positions of the battery cells 10 by providing holes or openings at corresponding positions to which the battery cells 10 are fitted, and the group of battery cells 10 inserted into the first holder 150 and the second holder 140 may be surrounded by a frame 130 provided along the peripheries of the battery cells 10 and may be accommodated between an upper cover (not shown) and the cooling plate 110 provided at a lower side of the battery pack. In an embodiment, a cooling unit including the cooling plate 110 may be installed at an outer side of the frame 130.

Figure 5:
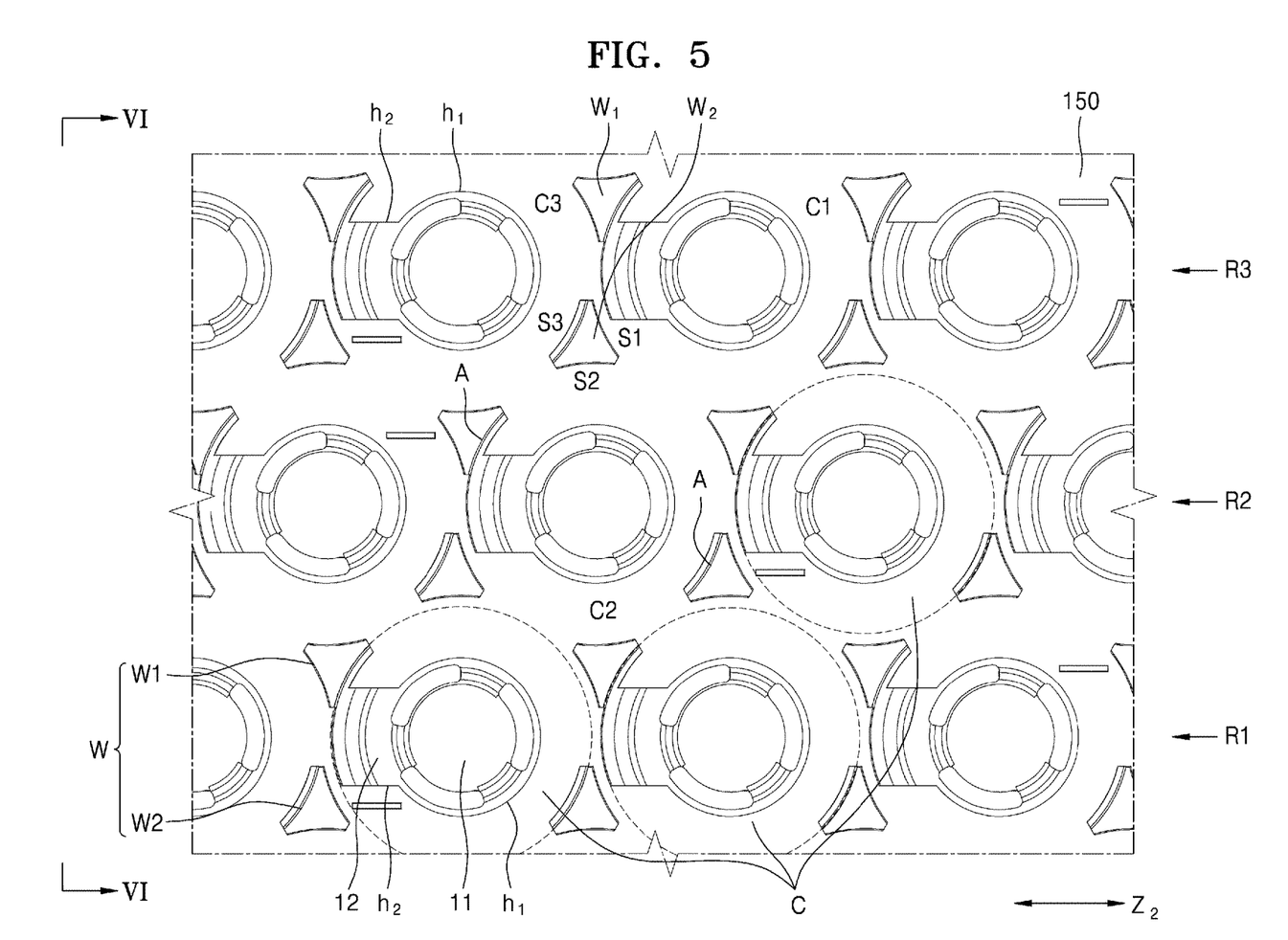
FIG. 5 is a view illustrating a structure of a first holder into which battery cells are inserted.
Figure 6:
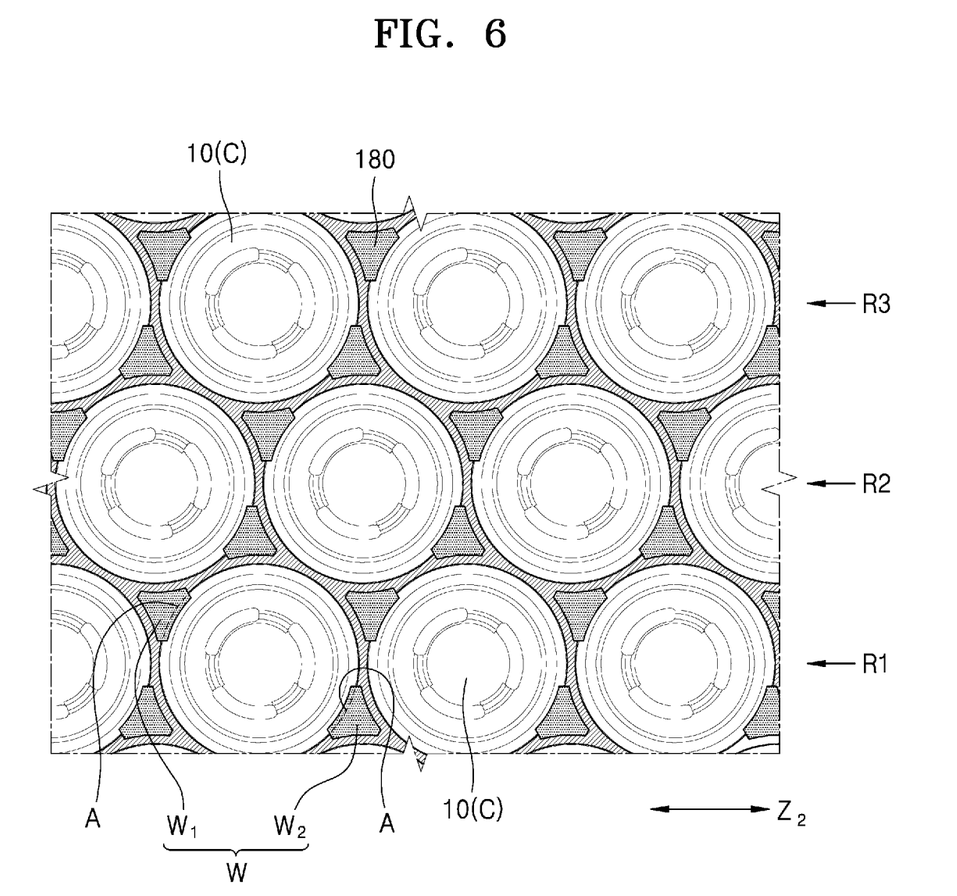
FIG. 6 is a cross-sectional view taken along the line VI-VI of FIG. 5 and illustrating a cross-section taken along a plane which crosses lengthwise lower portions of the battery cells shown in FIG. 5.

FIG. 5 is a view illustrating a structure of the first holder 150 into which the battery cells 10 are inserted; and FIG. 6 is a cross-sectional view taken along the line VI-VI of FIG. 5 and illustrating a cross-section taken along a plane which crosses lengthwise lower portions of the battery cells 10 shown in FIG. 5.

Referring to FIGS. 5 and 6, the first holder 150 may include cell regions C in which the battery cells 10 are arranged, and well regions W formed between the cell regions C. The cell regions C may refer to regions which are occupied by the battery cells 10, and the well regions W may refer to regions which are formed between adjacent battery cells 10 and are not occupied by the battery cells 10 but are filled with the filling resin 180. For example, each of the well regions W may be a region (e.g., a remaining region) which is formed among or between three cell regions C having adjacent circumferences and is not occupied by a battery cell 10. However, in an embodiment, a minimal gap may be secured between two adjacent cell regions C to avoid electrical and thermal interference between battery cells 10 occupying the two adjacent cell regions C, and, to this end, the minimal gap between two adjacent cell regions C may not be included in any well region W and may not be filled with the filling resin 180. Further, in an embodiment, the well regions W may be formed at positions which are different from the positions illustrated in FIG. 5 and/or in shapes different from the shapes illustrated in FIG. 5.

The filling resin 180 (refer to FIG. 4) may be provided to a height (e.g., a predetermined height) from the first holder 150 in which the battery cells 10 are assembled, and, in an embodiment, may entirely cross the cell regions C in which the battery cells 10 are arranged and the well regions W in which the battery cells 10 are not arranged. In this case, the cell regions C may refer to regions which are occupied by the battery cells 10, and the well regions W may refer to inter-cell regions which are not occupied by the battery cells 10 and are then filled with the filling resin 180.

In an embodiment, the cell regions C may include first and second terminal holes h1 and h2 through which the first and second terminals 11 and 12 of the battery cells 10 are exposed. In an embodiment, both the first and second terminals 11 and 12 having different polarities may be provided at the upper end 10a of each of the battery cells 10. Referring to FIG. 3, each of the battery cells 10 may include the cap assembly CA and the can N clamped to an edge of the cap assembly CA with an insulating member (not shown) therebetween, wherein the upper end of the cap assembly CA may form the first terminal 11, and the upper end of the can N may form the second terminal 12. The can N may extend from the lower end 10b of the battery cell 10 to the upper end 10a of the battery cell 10 along the circumference 10c of the battery cell 10. In an embodiment, the first terminal 11 may be provided at a center region of the upper end 10a of the battery cell 10, and the second terminal 12 may be provided at an edge region of the upper end 10a of the battery cell 10 around the first terminal 11. Therefore, the first terminal hole h1 may expose a center portion (corresponding to the first terminal 11) of the upper end 10a of the battery cell 10, and the second terminal hole h2 may expose an edge portion (corresponding to the second terminal 12) of the upper end 10a of the battery cell 10. In an embodiment, the first and second terminal holes h1 and h2 may be connected to each other and form one opening. As described with reference to FIG. 4, the bonding wires 20 may be connected to the first and second terminals 11 and 12 exposed through the first and second terminal holes h1 and h2.

In an embodiment, each of the battery cells 10 may be provided as a circular battery cell, and, thus, the cell regions C occupied by the battery cells 10 may be formed in a circular shape. In an embodiment, the battery cells 10 may be staggered such that each battery cell 10 may be inserted between adjacent battery cells 10 for densely arranging the battery cells 10, and, since the battery cells 10 are densely arranged using spaces between the adjacent battery cells 10, the battery pack may have reduced dead space and high energy density within a given area. For example, the battery cells 10 may be arranged in rows in a direction (corresponding to a direction Z2), and, in this case, battery cells 10 of adjacent rows may be staggered such that the battery cells 10 may be inserted between each other. For example, battery cells 10 (or cell regions C) of first and second rows R1 and R2 may be densely arranged with respect to each other in such a manner that the battery cells 10 (or cell regions C) of the first row R1 are inserted between the battery cells 10 (or the cell regions C) of the second row R2, and, similarly, battery cells 10 (or the cell regions C) of second and third rows R2 and R3 may be densely arranged with respect to each other in such a manner that the battery cells 10 (or the cell regions C) of the second row R2 are inserted between the battery cells 10 (or the cell regions C) of the third row R3.

Since the battery cells 10 are densely arranged as described above, the cell regions C in which the battery cells 10 are respectively arranged may also be formed in a dense pattern like the arrangement of the battery cells 10, and each cell region C may be inserted between adjacent cell regions C. That is, each cell region C may be formed between adjacent cell regions C. For example, each cell region C may be inserted between a pair of adjacent cell regions C such that the three cell regions C may have adjacent circumferences, and, in this case, a well region W may be formed at a center position among the three cell regions C having adjacent circumferences. In an embodiment, each of the well regions W may be a remaining region which is formed among three cell regions C having adjacent circumferences and is not occupied by any battery cell 10. However, in an embodiment, a minimal gap may be secured between two adjacent cell regions C to avoid electrical and thermal interference between battery cells 10 occupying the two adjacent cell regions C, and, in an embodiment, the minimal gap between two adjacent cell regions C may not be included in any well region W and may not be filled with the filling resin 180.

For example, each well region W may be surrounded by the circumferences of three adjacent cell regions C and may thus be defined by the three adjacent cell regions C. In an embodiment, each well region W may have a shape similar to a triangle as a whole, and three sides S1, S2, and S3 of the well region W may each have an arc shape to form a curved triangular shape, and, in this case, the three sides S1, S2, and S3 of the well region W may each have an arc shape convex toward the center of the well region W and may meet or intersect each other to form a curved triangle. Further, in another embodiment, the well regions W may be formed at positions which are different from the positions illustrated in FIG. 5 and/or in shapes which are different from the shapes illustrated in FIG. 5.

In an embodiment, each of the well regions W may be fluidly connected to an adjacent cell region C, and, in an embodiment, each of the well regions W may be fluidly connected to one of three cell regions C having adjacent circumferences with the well region W therebetween and may not be fluidly connected to the other two cell regions C. That is, in an embodiment, each well region W may be fluidly connected to only one cell region C. For example, one of the three curved sides S1, S2, and S3 defining each well region W may be an open side A which is open to a cell region C, and the well region W may be fluidly connected to the cell region C through the open side A. Throughout the present specification, the open side A of each well region W may refer to one of the three curved sides S1, S2, and S3 of the well region W regardless of whether the side is completely or partially open to a cell region C.

Each of the well regions W may refer to a location for supplying the filling resin 180 to an adjacent cell region C and may be fluidly connected to the adjacent cell region C. In this case, the expression "a well region W is fluidly connected to a cell region C" may mean that the filling resin 180 filled in the well region W may flow to the cell region C adjacent to the well region W. Referring to FIG. 6, in an embodiment, the filling resin 180 may be filled in each of the well regions W which is a remaining region located among three adjacent cell regions C and not occupied by a battery cell 10 and may be supplied to a cell region C adjacent to the well region W, such that the filling resin 180 may be provided in the well regions W and on the circumferences of the cell regions C adjacent to the well regions W, that is, on the circumferences 10c (refer to FIG. 3) of the battery cells 10 to securely fix the positions of the battery cells 10 without movement such as rotation or vibration.

Throughout the present specification, the expression "the filling resin 180 is supplied from the well regions W to the cell regions C" may mean that the filling resin 180 is supplied from the well regions W toward the circumferences 10c (refer to FIG. 3) of the battery cells 10. Each of the well regions W may be formed between three adjacent cell regions C having adjacent circumferences, and, in this case, the filling resin 180 supplied through boundaries between the well regions W and the cell regions C may flow toward the circumferences of the cell regions C, that is, the circumferences 10c (refer to FIG. 3) of the battery cells 10. As described with reference to FIG. 4, in an embodiment, the filling resin 180 may be supplied to a certain height from the first holder 150 in which the battery cells 10 are assembled, and, thus, the first and second terminals 11 and 12 exposed on the first holder 150 and the bonding wires 20 connected to the first and second terminals 11 and 12 may be embedded in the filling resin 180. In an embodiment, as shown in FIG. 6, the filling resin 180 supplied to a certain height from the first holder 150 may fill the empty spaces of the well regions W, and the filling resin 180 filled in the empty spaces of the well regions W may be supplied to the cell regions C which are fluidly connected to the well regions W. In this case, the filling resin 180 may be formed on the circumferences of the cell regions C adjacent to the well regions W, that is, on the circumferences 10c (refer to FIG. 3) of the battery cells 10. As described above, the filling resin 180 may be formed on the first and second terminals 11 and 12 of the upper ends 10a of the battery cells 10, which are exposed on the first holder 150, and on the circumferences of the cell regions C fluidly connected to the well regions W, that is, on the circumferences 10c (refer to FIG. 3) of the battery cells 10. As shown in FIG. 6, the filling resin 180 may be formed at positions separate from each other along the circumferences 10c (refer to FIG. 3) of the battery cells 10, and may thus effectively prevent or substantially prevent rotation of the battery cells 10.

As described with reference to FIG. 4, the first and second terminals 11 and 12 of the battery cells 10 may be connected to the first and second bus bars 161 and 162 through the bonding wires 20, and, thus, it may be necessary to prevent movement such as vibration or rotation of the battery cells 10 to securely maintain connections made by the bonding wires 20 between the first and second terminals 11 and 12 of the battery cells 10 and the first and second bus bars 161 and 162. In this case, the bonding wires 20 may be embedded in the filling resin 180 such that the bonding wires 20 may be insulated from the outside and may be securely fixed. In addition, since the filling resin 180 covers the first and second terminals 11 and 12 at the upper ends 10a of the battery cells 10 together with the bonding wires 20 while being formed on the circumferences of the cell regions C fluidly connected to the well regions W, that is, on the circumferences 10c (refer to FIG. 3) of the battery cells 10, the positions of the battery cells 10 may be securely fixed, and the bonding wires 20 may be prevented or substantially prevented from being damaged by movement of the battery cells 10.

Referring to FIG. 5, in an embodiment, the well regions W may include first and second well regions W1 and W2 according to a state of connection with the cell regions C. Each of the first well regions W1 may refer to a well region W which is connected to the second terminal hole h2 of a cell region C, and each of the second well regions W2 may refer to a well region W which is not connected to the second terminal hole H2 of any cell region C. Since the first well regions W1 are connected to the second terminal holes h2, the first well regions W1 may be fluidly connected to cell regions C through the second terminal holes h2. In this case, each of the first well regions W1 may be connected to a second terminal hole h2 which is connected to a first terminal hole h1, and, thus, the first and second terminal holes h1 and h2 and the well region W may be connected to each other and may form one opening.

One of the three curved sides S1, S2, and S3 of each of the first well regions W1 may be an open side A communicating with a second terminal hole h2, and the first well region W1 may be fluidly connected to a cell region C (for example, the second terminal hole H2 of the cell region C) through the open side A. Unlike the first well regions W1, each of the second well regions W2 is not connected to a second terminal hole h2, and one (corresponding to a third side S3) of the three curved sides S1, S2, and S3 of each of the second well regions W2, which has a greatest distance among distances from the three curved sides S1, S2, and S3 to the second terminal holes h2 of cell regions C respectively defined by the three curved sides S1, S2, and S3, may be an open side A. In an embodiment, referring to FIG. 5, first to third sides S1, S2, and S3 define a second well region W2, and when the distance from the first side S1 to the second terminal hole h2 of a first cell region C1, the distance from the second side S2 to the second terminal hole h2 of a second cell region C2, and the distance from the third side S3 to the second terminal hole h2 of a third cell region C3 are compared with each other, the distance from the third side S3 to the second terminal hole h2 of the third cell region C3 is the greatest, and, thus, the third side S3 may be an open side A.

For reference, according to the structure of each of the second well regions W2, the open side A of the second well region W2 may expose an edge portion of the upper end 10a of a battery cell 10. In this case, although the second terminal 12 (the edge of the upper end 10a) of the battery cell 10 is exposed through the open side A of the second well region W2, the open side A of the second well region W2 does not communicate with the second terminal hole h2 of any cell region C. As described above, each of the second terminal holes h2 of the cell regions C has a relatively large open area to sufficiently expose the second terminal 12 of a battery cell 10 and provide a connection point for a bonding wire 20 (refer to FIG. 4), and, thus, the second terminal holes h2 through which the bonding wires 20 are connected may be distinguished from the open sides A of the second well regions W2 through which no bonding wires 20 are connected. That is, the open sides A of the second well regions W2 are different from the second terminal holes h2 which provide connection points for the bonding wires 20 (refer to FIG. 4), and are not connected to the second terminal holes h2. As described above, according to embodiments, the first well regions W1 are connected to the second terminal holes h2, and the second well regions W2 are not connected to the second terminal holes h2.

Throughout the present specification, the expression "the second well regions W2 are not connected to the second terminal holes h2 or are not fluidly connected to the second terminal holes h2" may mean that the second well regions W2 do not directly meet the second terminal holes h2 or are not directly connected to the second terminal holes h2. Since each of the second well regions W2 is connected to a cell region C through the open side A of the second well region W2, the second well region W2 may be connected to the second terminal hole h2 of the cell region C through the cell region C, but the second well region W2 does not directly meet the second terminal hole h2 or is not directly connected to the second terminal hole h2.

Referring to FIG. 6, the filling resin 180 may be formed on the circumferences 10c of the battery cells 10 at positions separate from each other along the circumferences 10c of the battery cells 10. For example, the filling resin 180 may be formed on the circumferences 10c of the battery cells 10 by supplying the filling resin 180 from the well regions W adjacent to the battery cells 10 (or the cell regions C), and, in this case, the filling resin 180 may be formed at different positions along the circumferences 10c of the battery cells 10 by supplying the filling resin 180 from the first and second well regions W1 and W2 formed at different positions along the circumferences 10c of the battery cells 10. The filling resin 180 may prevent or substantially prevent the bonding wires 20 (refer to FIG. 4) connected to the first and second terminals 11 and 12 of the upper ends 10a of the battery cells 10 from being damaged by firmly fixing the positions of the battery cells 10. Thus, in an embodiment, to effectively prevent or substantially prevent rotation of the battery cells 10 by the filling resin 180, the filling resin 180 may be formed at symmetric positions along the circumferences 10c of the battery cells 10 or at positions at which the circumferences 10c of the battery cells 10 are uniformly divided. Therefore, in an embodiment, the first and second well regions W1 and W2 may be formed opposite to each other in a state in which the cell regions C in which the battery cells 10 are arranged between the first and second well regions W1 and W2.

That is, each of the cell regions C is fluidly connected to first and second well regions W1 and W2 which are opposite each other with the cell region C therebetween, and the filling resin 180 is supplied to the cell region C from the first and second well regions W1 and W2 which are opposite each other with the cell region C therebetween, such that the filling resin 180 may be formed at different positions along the circumferences 10c of the battery cells 10 to effectively prevent or substantially prevent rotation of the battery cells 10.

Referring to FIGS. 4 and 5, each of the cell regions C may receive the filling resin 180 through the open sides A of the first and second well regions W1 and W2 which are arranged at opposite positions of the cell region C. In this case, the first well region W1 may be connected to the cell region C through the second terminal hole h2, and the second well region W2 may be connected to the cell region C through the open side A of the second well region W2 which is opposite the first well region W1 and distant from the first well region W1, that is, opposite and distant from the second terminal hole h2 connected to the first well region W1. For example, one (corresponding to the third side S3) of the three curved sides S1, S2, and S3 of the second well region W2, which has a greatest distance among distances from the three curved sides S1, S2, and S3 to the second terminal holes h2 of cell regions C respectively defined by the three curved sides S1, S2, and S3, is an open side A, and, thus, the filling resin 180 may be supplied through the second well region W2 which is opposite the first well region W1 such that the filling resin 180 may be formed at symmetric positions along the circumferences of the cell regions C, that is, along the circumferences 10c of the battery cells 10, through the first and second well regions W1 and W2 arranged at opposite positions of the cell regions C, thereby effectively preventing or substantially preventing movement of the battery cells 10.

As described with reference to FIG. 5, the curved first to third sides S1, S2, and S3 of the second well region W2 may define the second well region W2 and different cell regions C (first to third cell regions C1, C2, and C3), and the distances from the first to third sides S1, S2, and S3 to the second terminal holes h2 of the first to third cell regions C1, C2, and C3 may be different from each other. In this case, the third side S3 of the first to third sides S1, S2, and S3, which has the greatest distance among the distances from the first to third sides S1, S2, and S3 to the second terminal holes h2 of the first to third cell regions C1, C2, and C3 respectively defined by the first to third sides S1, S2, and S3, may be an open side A. According to this configuration, one side of each of the cell regions C is connected to the first well region W1 through the second terminal hole h2 of the cell region C, and another side of the cell region C is connected to the second well region W2 which is opposite the second terminal hole h2, such that the filling resin 180 may be supplied to the circumference 10c of the battery cell 10 through the first and second well regions W1 and W2 arranged opposite each other and may be formed at symmetric positions on the circumference 10c of the battery cell 10.

The first and second well regions W1 and W2 may be arranged at opposite sides of each of the cell regions C, and, for example, the first and second well regions W1 and W2 may be arranged at opposite sides of the cell region C in a diagonal direction. Here, the diagonal direction may refer to a direction inclined at an angle (e.g., a predetermined angle) with respect to the row direction Z2 of the battery cells 10, and the first and second well regions W1 and W2 may be arranged at opposite sides of each cell region C in the diagonal direction. As described later, the first well regions W1 and the second well regions W2 may be arranged in the row direction Z2 of the battery cells 10 in different rows, and, thus, the first and second well regions W1 and W2 may be arranged at opposite sides of the cell regions C in the diagonal direction rather than being arranged on opposite sides of the cell regions C in the row direction Z2 of the battery cells 10.

Referring to FIG. 5, each of the well regions W may be formed among three neighboring cell regions C which have circumferences adjacent to each other. For example, first and second well regions W1 and W2 may be formed between the cell regions C (or battery cells 10) of the first row R1 and the cell regions C (or battery cells 10) of the second row R2 in such a manner that a first well region W1 is formed among two cell regions C (or two battery cells 10) of the first row R1 and a cell region C (or battery cell 10) of the second row R2, and a second well region W2 is formed among two cell regions C (or two battery cells 10) of the second row R2 and a cell region C (or battery cell 10) of the first row R1. In this manner, first well regions W1 may be formed at positions relatively close to the cell regions C (or battery cells 10) of the first row R1, and second well regions W2 may be formed at positions relatively close to the cell regions C (or battery cells 10) of the second row R2.

Similarly, first and second well regions W1 and W2 may be formed between the cell regions C (or battery cells 10) of the second row R2 and the cell regions C (or battery cells 10) of the third row R3 in such a manner that: a first well region W1 is formed among two cell regions C (or two battery cells 10) of the second row R2 and a cell region C (or battery cell 10) of the third row R3; and a second well region W2 is formed among two cell regions C (or two battery cells 10) of the third row R3 and a cell region C (or battery cell 10) of the second row R2. In this manner, first well regions W1 may be formed at positions relatively close to the cell regions C (or battery cells 10) of the second row R2, and second well regions W2 may be formed at positions relatively close to the cell regions C (or battery cells 10) of the third row R3.

Referring to FIG. 5, the first and second well regions W1 and W2, which are closer to the cell regions C (or battery cells 10) of the second row R2 than to the cell regions C (battery cells 10) of the first and third rows R1 and R3, are arranged between the cell regions C (or battery cells 10) of the second row R2. For example, each of the first well regions W1 which are relatively close to the cell regions C (or battery cells 10) of the second row R2 is formed among two cell regions C (or two battery cells 10) of the second row R2 and a cell region C (or battery cell 10) of the third row R3, and each of the second well regions W2 which are relatively close to the cell regions C (or battery cells 10) of the second row R2 is formed among two cell regions C (or two battery cells 10) of the second row R2 and a cell region C (or battery cell 10) of the first row R1. In other words, first and second well regions W1 and W2 may be formed together between the cell regions C (or battery cells 10) of the second row R2, for example, in such a manner that the second well regions W2 are formed at positions relatively close to the cell regions C (or battery cells 10) of the first row R1, and the first well regions W1 are formed at positions relatively close to the cell regions C (or battery cells 10) of the third row R3. For example, the first and second well regions W1 and W2 may be formed together at positions adjacent to second terminal holes h2 in such a manner that the first well regions W1 are connected to the second terminal holes h2, and the second well regions W2 are not connected to the second terminal holes h2.

The first and second well regions W1 and W2 may be arranged in the row direction Z2 of the battery cells 10. That is, the first well regions W1 may be arranged in the row direction Z2 of the battery cells 10, and the second well regions W2 may be arranged in the row direction Z2 of the battery cells 10. In this case, the rows of the first well regions W1 and the rows of the second well regions W2 may be parallel to the row direction Z2 of the battery cells 10, but the first well regions W1 and the second well regions W2 may be arranged in different rows, not in the same row.

For reference, throughout the present specification, the row direction Z2 of the battery cells 10 may refer to the direction of long sides of the first holder 150 in which the battery cells 10 are assembled as shown in FIG. 2. In addition, as shown in FIG. 5, the row direction Z2 of the battery cells 10 may refer to the direction in which the second terminal holes h2 are open, or the direction from the first terminal holes h1 to the second terminal holes h2. For example, the first and second well regions W1 and W2 may be arranged at positions close to the second terminal holes h2 in the open direction of the second terminal holes h2, that is, in the row direction Z2 of the battery cells 10 to form rows which are parallel to the row direction Z2 of the battery cells 10 but are different from each other.

Figure 7:
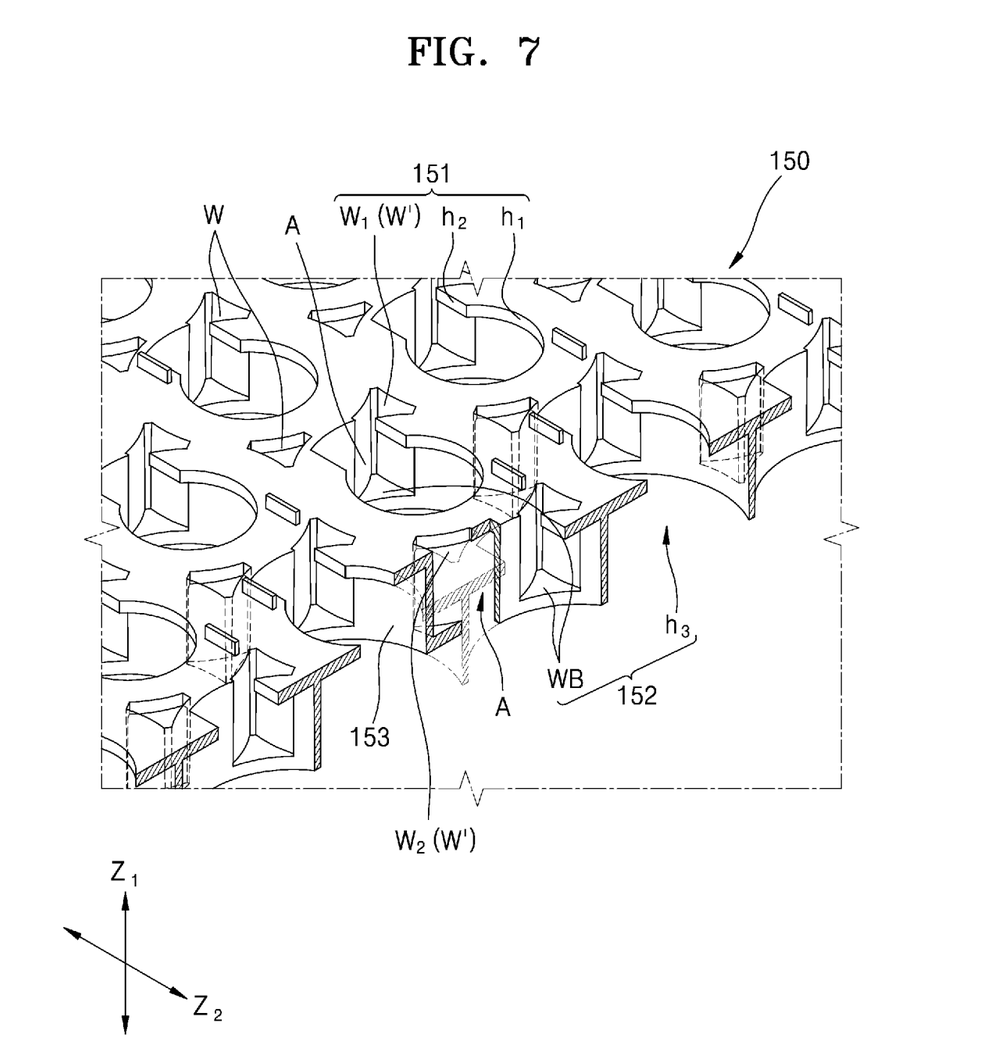
FIG. 7 is a cutaway perspective view illustrating a portion of the first holder.

FIG. 7 is a cutaway perspective view illustrating a portion of the first holder 150.

Referring to FIG. 7, in an embodiment, the first holder 150 may include: first and second plate members 151 and 152 which are parallel to each other and separate or spaced apart from each other in the length direction (vertical direction Z1) of the battery cells 10; and a hollow cylinder member 153 which is arranged between the first and second plate members 151 and 152 and surrounds at least portions of the circumferences 10c (refer to FIG. 3) of the battery cells 10.

The first plate member 151 may include the first and second terminal holes h1 and h2 in the cell regions C to respectively expose the first and second terminals 11 and 12 of the battery cells 10. The first plate member 151 may cover the cell regions C except for the first and second terminal holes h1 and h2 to prevent or substantially prevent the upper ends 10a of the battery cells 10 from being separated from the first holder 150 through the first plate member 151 and regulate vertical assembly positions of the battery cells 10. In addition, the first plate member 151 may include well holes W' in the well regions W to expose the well regions W. For example, the filling resin 180 may be injected through the well holes W' of the first plate member 151, and the injected filling resin 180 may flow into the cell regions C through the open sides A of the well regions W such that the cell regions C may be filled with the filling resin 180.

The second plate member 152 may include assembly holes h3 in the cell regions C to insert the circumferences 10c (refer to FIG. 3) of the battery cells 10 into the cell regions C through the assembly holes h3. In an embodiment, the assembly holes h3 may surround the circumferences 10c of the battery cells 10. In an embodiment, the second plate member 152 may include well bottoms WB in the well regions W to confine the filling resin 180 in the well regions W. The well regions W may be defined between the first plate member 151 and the well bottoms WB of the second plate member 152, and the well bottoms WB may limit amounts of the filling resin 180 filled in the well regions W. For example, the well regions W may be formed between the first and second plate members 151 and 152, and the well regions W may be formed from the well holes W' of the first plate member 151 to the well bottoms WB of the plate member 152. For example, the filling resin 180 injected through the well holes W' of the first plate member 151 may be filled starting from the well bottoms WB of the second plate member 152, and since the filling resin 180 is blocked by the well bottoms WB and does not flow below the well bottoms WB, the injection amount of the filling resin 180 may be reduced. That is, since the well bottoms WB are formed on the second plate member 152 to limit the volume filled with the filling resin 180 between the first and second plate members 151 and 152, an injection amount of the filling resin 180 may be reduced to decrease material costs and weight of the battery pack.

In an embodiment, the filling resin 180 covers the bonding wires 20 (refer to FIG. 4) to insulate and protect the bonding wires 20 connected to the first and second terminals 11 and 12 of the battery cells 10 and is formed on portions of the circumferences 10c (refer to FIG. 3) of the battery cells 10 to fix the positions of the battery cells 10 to which the bonding wires 20 are connected, and the well bottoms WB may be formed on the second plate member 152 to save material costs without an excessively injected amount of the filling resin 180 and maintain the injection amount of the filling resin 180 at a given value.

The hollow cylinder member 153 may be provided between the first and second plate members 151 and 152 to surround the circumferences 10c (refer to FIG. 3) of the battery cells 10. The hollow cylinder member 153 may surround at least portions of the circumferences 10c of the battery cells 10. The hollow cylinder member 153 may stably support the battery cells 10 in an upright position with respect to the first and second plate members 151 and 152 while surrounding the circumferences 10*c* of the battery cells 10.

In an embodiment, the hollow cylinder member 153 may partially surround the circumferences 10*c* of the battery cells 10 rather than entirely surrounding the circumferences 10*c* of the battery cells 10, and may include portions open to the battery cells 10. In this case, the open portions of the hollow cylinder member 153 may correspond to the open sides A of the well regions W formed between the first and second plate members 151 and 152. For example, the well regions W between the first and second plate members 151 and 152 may be connected through the open sides A to the inside of the hollow cylinder member 153 in which the battery cells 10 are arranged, and the filling resin 180 filled in the well regions W may be in contact with the circumferences 10*c* (refer to FIG. 3) of the battery cells 10 which are exposed from the hollow cylinder member 153 through the open sides A such that the positions of the battery cells 10 may be fixed.

Figure 8:
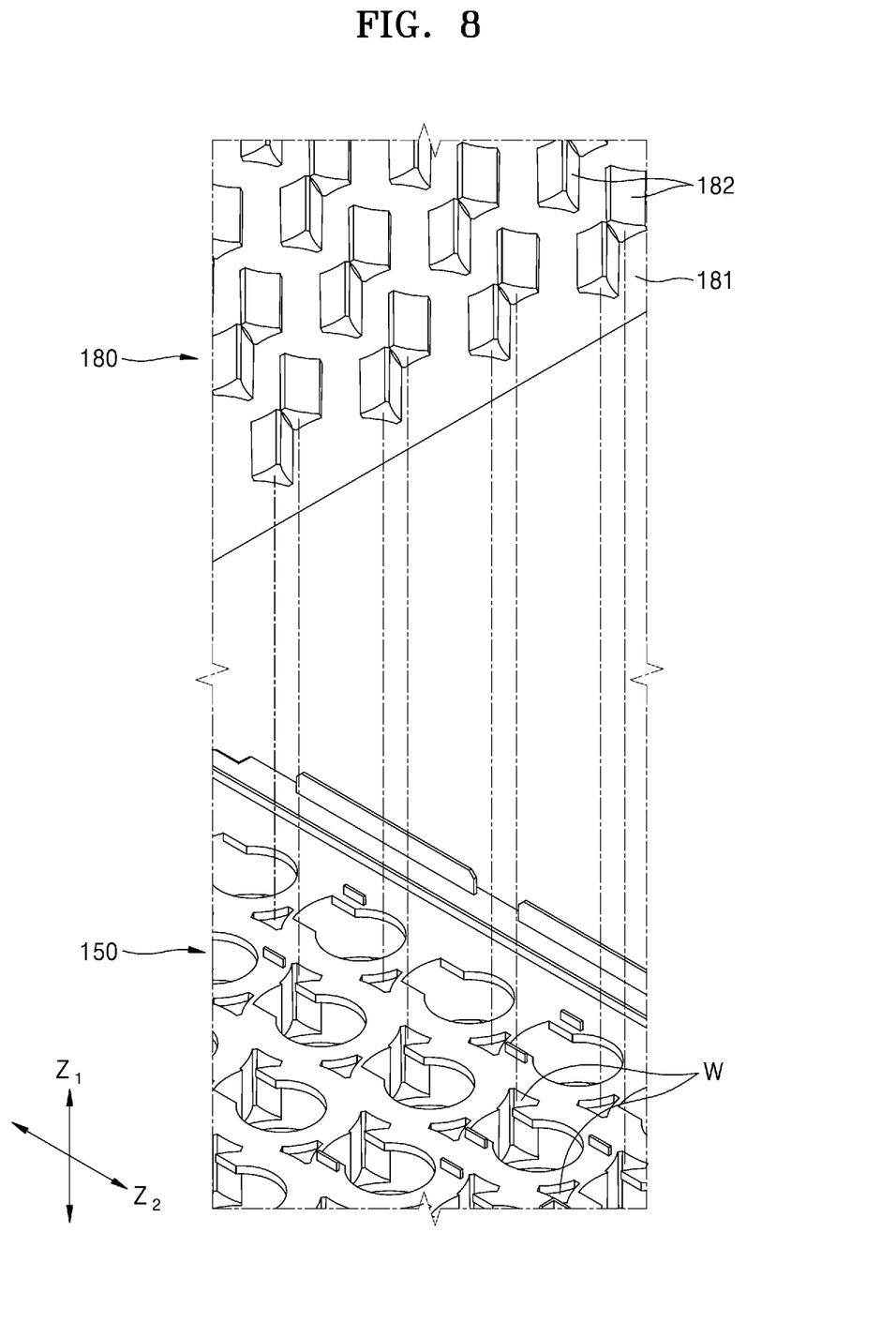
FIG. 8 is a view illustrating a filling resin structure.

FIG. 8 is a view illustrating a structure of the filling resin 180 after the filling resin 180 is cured.

Referring to FIG. 8, the filling resin 180 may be supplied to a height (e.g., a predetermined height) from the first holder 150 in which the battery cells 10 are assembled. The filling resin 180 may include: a plate portion 181 formed in a flat plate shape on the first holder 150; and protrusions 182 protruding downward from the plate portion 181 and filling the well regions W of the first holder 150. The protrusions 182 may be provided on opposite sides of the circumferences 10*c* of the battery cells 10.

In an embodiment, the filling resin 180 may include a foamed resin, such as a foamed resin which is curable over time. For example, the filling resin 180 may include a foamed silicone resin. Referring to FIG. 4, the filling resin 180 may cover the first and second terminals 11 and 12, to which the bonding wires 20 are connected, together with the safety vents 13 provided between the first and second terminals 11 and 12. The safety vents 13 may have a structure which is easily fractured in response to excessive internal pressure of the battery cells 10 to relieve the excessive internal pressure. In this case, although the filling resin 180 covers the safety vents 13 of the battery cells 10, since the filling resin 180 includes a foamed resin, the filling resin 180 may not hinder the discharge of gas through the safety vents 13 when the safety vents 13 are fractured, and, for example, gas discharged through the safety vents 13 may flow to the outside of the battery pack while breaking the filling resin 180.

In an embodiment, the filling resin 180 includes a foamed resin which is curable over time, the fluidity of the filling resin 180 may decrease over time after the filling resin 180 is injected into the first holder 150, and the filling resin 180 supplied from the well regions W to the cell regions C may be selectively formed on the circumferences 10*c* of the battery cells 10 only at local positions adjacent to the well regions W rather than being formed all around the circumferences of the cell regions C, that is, the circumferences 10*c* of the battery cells 10. That is, referring to FIG. 5, in an embodiment, the filling resin 180 may be supplied to the circumferences 10*c* (refer to FIG. 3) of the battery cells 10 from the well regions W which are formed at opposite positions, and, thus, the filling resin 180 may be locally formed at opposite positions on the circumferences 10*c* of the battery cells 10. However, in an embodiment, the filling resin 180 may be formed to completely surround the circumferences 10*c* of the battery cells 10 according to the curing rate of the filling resin 180. However, in embodiments, the filling resin 180 may be formed at local positions on the circumferences 10*c* of the battery cells 10 to limit the injection amount of the filling resin 180 and reduce the material costs and weight of the battery pack, and, thus, a resin curable at a suitable rate may be selected as the filling resin 180.

Figure 9:
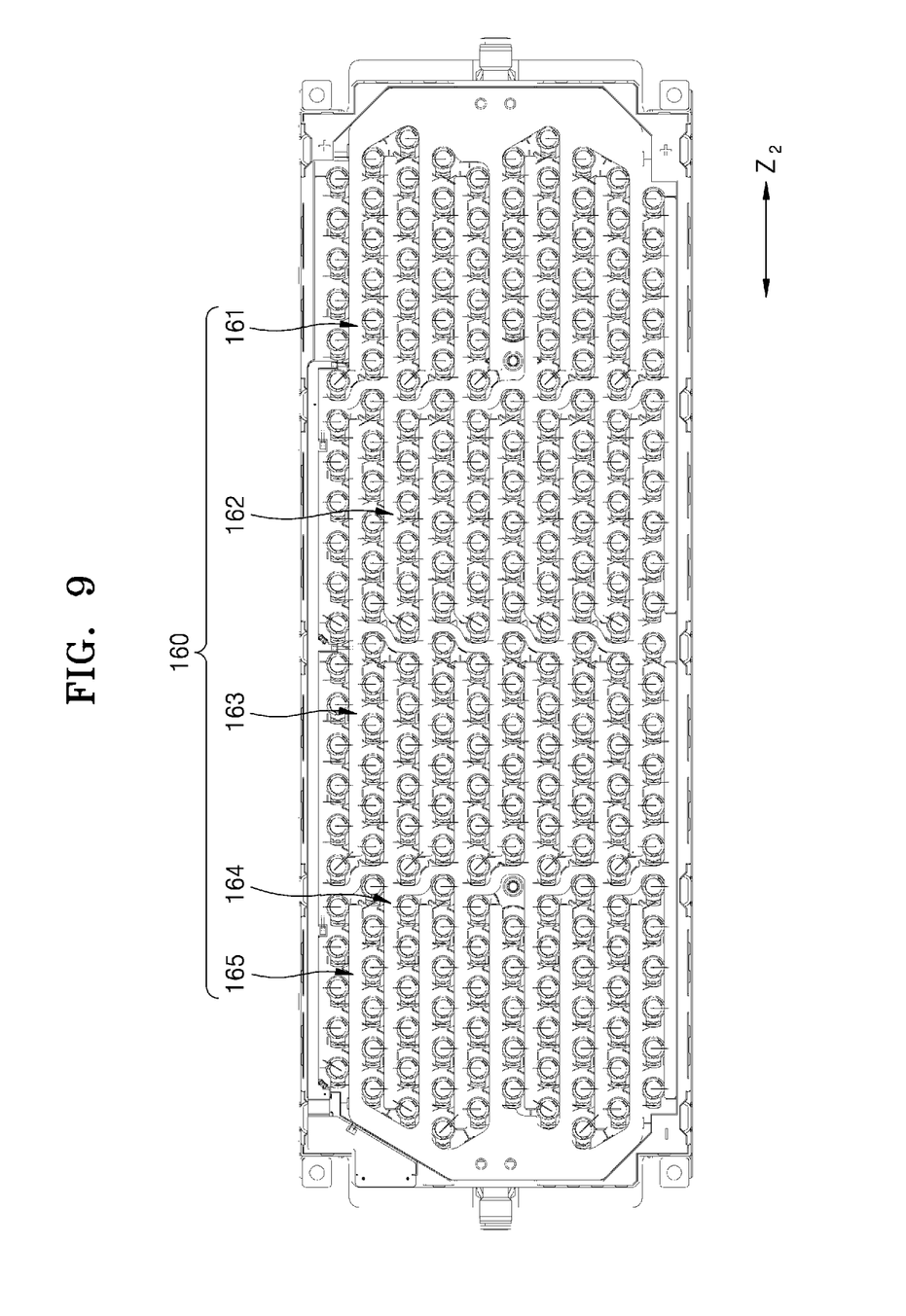
FIG. 9 is a view illustrating a bus bar arrangement structure.

FIG. 9 is a view illustrating a bus bar arrangement structure.

Referring to FIG. 9, in an embodiment, a bus bar 160 may include first to fifth bus bars 161, 162, 163, 164, and 165 which are alternately staggered to be inserted into each other in a comb shape. For example, the first and second bus bars 161 and 162 inserted into each other in a comb shape may extend along rows of battery cells 10 at opposite sides of the rows of the battery cells 10 and may respectively be wire bonded to the first and second terminals 11 and 12 of the battery cells 10. Like the first and second bus bars 161 and 162, the second and third bus bars 162 and 163 inserted into each other in a comb shape may extend along rows of battery cells 10 at opposite sides of the rows of the battery cells 10 and may respectively be wire bonded to the first and second terminals 11 and 12 of the battery cells 10. Similarly, the third and fourth bus bars 163 and 164, and the fourth and fifth bus bars 164 and 165 may extend along rows of battery cells 10 and may be respectively and electrically connected to the first and second terminals 11 and 12 of the battery cells 10. For reference, the second to fourth bus bars 162, 163, and 164 may connect a group of battery cells 10 in parallel and may connect the group of battery cells 10 in series to another adjacent group of battery cells 10.

According to embodiments, the filling resin 180 covers connection members which connect terminals of the battery cells 10 such that the connection members may be insulated and protected from the outside, and, in addition, the filling resin 180 is formed on the circumferences 10*c* of the battery cells 10 to prevent or substantially prevent rotation or movement of the battery cells 10 and thus prevents or substantially prevents the connection members from being damaged.

In addition, according to embodiments, an injection amount of the filling resin 180 may be adjusted as needed to prevent or reduce waste of materials caused by excessive injection of the filling resin 180, thereby reducing the weight of the battery pack.

It is to be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as set forth by the following claims.

What is claimed is:
1. A battery pack comprising:
a plurality of battery cells;
a holder comprising cell regions in which the plurality of battery cells are arranged, and well regions each arranged between adjacent cell regions of the cell regions, each of the well regions being connected to at least one of the adjacent cell regions; and a resin in the well regions and on a periphery of the battery cells to fix the position of the battery cells.

2. The battery pack of claim 1, wherein each of the well regions is provided among three adjacent cell regions of the cell regions and is fluidly connected to a cell region of the three adjacent cell regions.

3. The battery pack of claim 1, wherein each of the well regions is surrounded by three sides which define boundaries with adjacent cell regions, and the three sides define the boundaries, respectively, with the adjacent cell regions.

4. The battery pack of claim 3, wherein each of the well regions has a curved triangular shape defined by the three sides which meet each other and each has an arc shape convex toward a center of the well region.

5. The battery pack of claim 3, wherein one of the three sides of the well region is provided as an open side which is at least partially open to an adjacent cell region defined by the side.

6. The battery pack of claim 5, wherein the well region is fluidly connected to the adjacent cell region through the open side.

7. The battery pack of claim 6, wherein the resin is connected to the well region through the open side and is provided on circumferences of the plurality of battery cells.

8. The battery pack of claim 7, wherein the resin is provided on the circumferences of the plurality of battery cells at positions which are separate from each other along the circumferences of the plurality of battery cells.

9. The battery pack of claim 1, wherein each of the cell regions is fluidly connected to first and second well regions which are opposite each other with the cell region therebetween.

10. The battery pack of claim 1, wherein the well regions comprise:
first well regions which are connected to terminal holes of the cell regions; and
second well regions which are not connected to the terminal holes of the cell regions.

11. The battery pack of claim 10, wherein
each of the first well regions comprises three curved sides which define the first well region and comprise an open side connected to a terminal hole of the terminal holes, and
each of the second well regions comprises three curved sides defining the second well region, and one of the three curved sides, which has a greatest distance among respective distances from the three curved sides to terminal holes of cell regions respectively defined by the three curved sides, is an open side.

12. The battery pack of claim 10, wherein the terminal holes of the cell regions are second terminal holes through which upper-end edges of the plurality of battery cells are exposed.

13. The battery pack of claim 10, wherein
the cell regions comprise cell regions arranged in first and second rows which are adjacent to each other and parallel to a first direction, and
the first and second well regions are provided at different positions between the cell regions of the first and second rows.

14. The battery pack of claim 13, wherein
each of the first well regions is provided among two cell regions of the first row and a cell region of the second row at a position nearer to battery cells of the first row than battery cells of the second row, and
each of the second well regions is provided among two cell regions of the second row and a cell region of the first row at a position nearer to battery cells of the second row than battery cells of the first row.

15. The battery pack of claim 10, wherein the first and second well regions are arranged in a row direction of the plurality of battery cells.

16. The battery pack of claim 15, wherein the row direction of the plurality of battery cells is parallel to a long side of the holder.

17. The battery pack of claim 15, wherein
the cell regions comprise first and second terminal holes through which first and second terminals of battery cells of the plurality of battery cells are exposed, and
the row direction of the plurality of battery cells is a direction from the first terminal holes to the second terminal holes.

18. The battery pack of claim 10, wherein
each of the cell regions comprises first and second terminal holes through which first and second terminals of a battery cell of the plurality of battery cells are exposed, and
the first and second terminal holes and the first well regions are connected to each other and define one opening.

19. The battery pack of claim 1, further comprising bonding wires respectively connected to first and second terminals of battery cells of the plurality of battery cells through first and second terminal holes of the holder.

20. The battery pack of claim 19, wherein the resin covers the bonding wires together with the first and second terminals of the battery cells.

21. The battery pack of claim 1, wherein the holder comprises:
first and second plate members which are parallel to each other and separate from each other in a length direction of the plurality of battery cells; and
a hollow cylinder member surrounding at least portions of circumferences of the plurality of battery cells between the first and second plate members.

22. The battery pack of claim 21, wherein the first plate member comprises:
first and second terminal holes in the cell regions to respectively expose first and second terminals of the plurality of battery cells; and
well holes in the well regions to expose the well regions.

23. The battery pack of claim 22, wherein the first plate member covers the cell regions except for the first and second terminal holes.

24. The battery pack of claim 22, wherein the second plate member comprises:
assembly holes in the cell regions to receive the circumferences of the plurality of battery cells into the cell regions through the assembly holes; and
well bottoms in the well regions to confine the resin in the well regions.

25. The battery pack of claim 24, wherein the well regions extend from the well holes of the first plate member to the well bottoms of the second plate member.

26. The battery pack of claim 21, wherein the hollow cylinder member surrounds portions of the circumferences of the plurality of battery cells and comprises open portions open to the plurality of battery cells.

27. The battery pack of claim 26, wherein the open portions of the hollow cylinder member define open sides of the well regions between the first and second plate members.

28. A battery pack comprising:
a plurality of battery cells;
a holder having:
   openings extending through the holder and defining cell regions in which the plurality of battery cells are arranged; and
   voids in the holder defining well regions each arranged between adjacent cell regions of the cell regions, each of the well regions being open to at least one of the adjacent cell regions; and
a resin in the well regions and at least partially in the cell regions.

\* \* \* \* \*